United States Patent [19]
Emori et al.

[11] Patent Number: 5,740,879
[45] Date of Patent: Apr. 21, 1998

[54] POWER STEERING APPARATUS

[75] Inventors: Yasuyoshi Emori; Yukimitsu Minamibata; Ikuo Nomura; Tetsuya Koike, all of Saitama-ken, Japan

[73] Assignee: Jidosha Kiki Co., Ltd., Tokyo, Japan

[21] Appl. No.: 465,769

[22] Filed: Jun. 6, 1995

[30] Foreign Application Priority Data

Jun. 27, 1994 [JP] Japan .................... 6-144618
Jul. 21, 1994 [JP] Japan .................... 6-169532

[51] Int. Cl.$^6$ .................................................. B62D 5/06
[52] U.S. Cl. ...................... 180/423; 180/441; 180/442
[58] Field of Search ............................ 180/442, 441, 180/417, 421, 422, 423

[56] References Cited

U.S. PATENT DOCUMENTS

| | | | |
|---|---|---|---|
| 4,830,131 | 5/1989 | Miyoshi et al. | 180/423 |
| 4,852,462 | 8/1989 | Uchida et al. | 180/442 |
| 4,860,635 | 8/1989 | Uchida et al. | 180/442 |
| 4,860,846 | 8/1989 | Uchida et al. | 180/423 |
| 4,862,985 | 9/1989 | Uchida et al. | 180/423 |
| 4,865,147 | 9/1989 | Uchida | 180/423 |
| 4,875,542 | 10/1989 | Uchida et al. | 180/142 |
| 4,884,648 | 12/1989 | Uchida et al. | 180/442 |
| 4,958,695 | 9/1990 | Uchida et al. | 180/422 |
| 5,038,878 | 8/1991 | Uchida et al. | 180/422 |
| 5,092,418 | 3/1992 | Suzuki et al. | 180/441 |
| 5,207,780 | 5/1993 | Norimatsu et al. | 180/423 |
| 5,253,729 | 10/1993 | Suzuki | 180/422 |
| 5,515,938 | 5/1996 | Haga et al. | 180/417 |
| 5,634,527 | 6/1997 | Emori | 180/441 |

FOREIGN PATENT DOCUMENTS

| | | |
|---|---|---|
| 61-105273 | 5/1986 | Japan . |
| 61-132466 | 6/1986 | Japan . |
| 2-175467 | 7/1990 | Japan . |

*Primary Examiner*—Brian L. Johnson
*Assistant Examiner*—Gary Savitt
*Attorney, Agent, or Firm*—Flynn, Thiel, Boutell & Tanis, P.C.

[57] ABSTRACT

A vehicle speed responsive power steering apparatus enables a pressure which acts upon a power cylinder to be variably controlled in accordance with a vehicle speed or the like, thus allowing an assisting force to be controlled in a variable manner. A control valve CV selectively connects a pump P and a tank T to left and right chambers CL, CR of a power cylinder. The control valve comprises a first and a second fluid pressure bridge circuit 10, 20. The first fluid pressure bridge circuit includes a left and a right path 12, 13, in which a first and a second pair of variable throttles 1R, 1L and 2L, 2R are disposed which are opened or closed in response to a steering operation. The left and the right chamber of the cylinder are connected to the respective paths at the junctions between the variable throttles. A pair of paths 21, 22 branch from a supply path 11 extending from the pump, and a second fluid pressure bridge circuit is defined between the paths 21, 22, in parallel relationship with the first fluid pressure bridge circuit. The second fluid pressure bridge circuit includes variable throttles 3L, 3R, 4R, 4L which are opened and closed in response to a steering operation, and a vehicle speed responsive variable throttle valve 6 which is controlled to be opened or closed in accordance with a vehicle speed.

6 Claims, 9 Drawing Sheets

POWER STEERING APPARATUS

BACKGROUND OF THE INVENTION AND RELATED ART STATEMENT

The invention relates to a power steering apparatus which provides an adequate control over a steering force in accordance with a running condition of a vehicle and the magnitude of a load during the steering operation, by controlling a steering assisting power in accordance with a running condition such as vehicle speed.

In a power steering apparatus which produces an assisting power which alleviates the force required to operate a steering wheel of an automobile, it is desirable that the steering force be controlled in accordance with a running speed of a vehicle (which is hereafter referred to as vehicle speed). Thus, the control of the steering force must be such that a light steering operation is enabled when a vehicle is at rest or running at a low speed while a rigidity is imparted to the steering wheel to assure the stability when the vehicle is running straightforward at a high speed.

At this end, a vehicle speed responsive power steering apparatus is known in the art which utilizes a flow control valve. In such apparatus, a pump which is driven for rotation by an engine of the automobile has the function of a flow control valve which feeds a pressure oil while limiting it to a given flow rate, and in addition, includes a variable throttle valve which is responsive to a vehicle speed so that the flow rate be reduced to reduce the pressure generated when the vehicle is running at high speed, thus reducing an assisting power supplied from a power cylinder so as to increase a steering force of an increased magnitude which is required of an operator.

However, with an apparatus of such flow rate control type, the flow rate from the pump is controlled only in accordance with the vehicle speed, and accordingly, the control of the steering force has been limited to a relatively narrow range, which is unsatisfactory. In addition, such apparatus suffers from a poor tracking capability when a rapid steering occurs during the time the vehicle is running at a high speed.

A vehicle speed responsive power steering apparatus is also known utilizing an oil pressure reaction system of vehicle speed responsive type including a reaction piston which selectively provides a constraint between or allows a relative rotation between an input and an output shaft of a steering mechanism in accordance with the magnitude of a reaction oil pressure. Specifically, when the vehicle is at rest or running at a low speed, the reaction pressure is minimized to enable a light steering operation, while when the vehicle is running at a high speed, the reaction pressure is increased to impart a rigidity to the steering wheel so as to secure the stability when the vehicle is running straightforward. Various structures are proposed as disclosed in Japanese Laid-Open Patent Applications No. 105,273/1986 and No. 132,466/1986.

However, an apparatus of such oil pressure reaction control type also requires for its operation a reaction pressure control valve which produces an oil pressure reaction corresponding to a vehicle speed, a reaction piston and an oppositely located reaction receiver which must be provided between the input and the output shaft, thus increasing the number of parts required and resulting in a complex construction, which disadvantageously results in an increased cost. In addition, with a conventional apparatus as mentioned above, the friction occurring in an oil pressure reaction mechanism presents a problem to the operating performance.

Accordingly, there is a need for a vehicle speed responsive power steering apparatus which can be provided at a low cost and which enables a control of the steering force over a practicable range. To meet such need, Japanese Laid-Open Patent Application No. 175,467/1990 discloses an apparatus including a variable throttle valve which is controlled in accordance with the vehicle speed, and an additional variable throttle which is controlled to produce a reduced opening when a relative angular displacement between the input and the output shaft increases. The combination of the variable throttle valve and the variable throttle is effective to control the amount of bleed to a bypass path which connects between a feed pass from the pump to a control valve and a return path from the control valve to a tank, thus securing the flow rate to be supplied to the power cylinder during the steering operation.

With this arrangement, the variable throttle valve having an opening which is controlled in accordance with the vehicle speed controls the amount of bleed to the tank, while the variable throttle disposed in the bypass path has its opening reduced when the steering wheel is operated through an increased stroke. For example, when the steering wheel is operated as the vehicle is running at a medium or high speed, the flow through the bypass path is limited independently from the opening of the variable throttle valve, thus securing the flow rate to be supplied to the power cylinder.

With this apparatus, it is possible to reduce the opening of the variable throttle in association with the operation of the steering wheel even when the variable throttle valve has a large opening as when the vehicle is running at a medium or high speed, thus assuring the flow rate to be supplied to the power cylinder by reducing the flow which is discharged through the bypass path. In this manner, a degradation in the response caused by an insufficient flow rate which has been experienced in the prior art can be overcome, providing an optimum control over the steering force in accordance with the running condition.

However, even with this apparatus, the variable throttle valve which responds to the vehicle speed and the variable throttle which is associated with a steer angle must be separately disposed in the bypass path between the feed path which is located upstream of the control valve and the return path which is located downstream thereof. Again, the number of parts required increases, and the construction is complex, causing an increased cost. It is desirable to provide some means which is capable of sweeping these deficiencies.

In other words, it is desirable to provide a vehicle speed responsive power steering apparatus having provisions such that a good response and tracking capability during the steering operation are secured when the vehicle is running at a high speed, the influence of friction as occurring in an oil pressure reaction mechanism is minimized, the axial length of a steering mechanism including the control valve be reduced and a control over the steering force be secured over a practicable range at a reduced cost.

OBJECT AND SUMMARY OF THE INVENTION

Accordingly, it is an object of the invention to provide a power steering apparatus in which the construction of the overall apparatus including the control valve is improved and is combined with a vehicle speed responsive variable throttle valve so that the pressure which acts upon a power cylinder is controlled in a variable manner in accordance with a vehicle speed, an increase in a steer angle during the steering operation, or a fluctuation in a load such as the steering rate to enable an adequate and positive control over the assisting power over a practicable range at a reduced cost and which is preferred for use as a vehicle speed responsive type.

Such object is accomplished in a power steering apparatus including a control valve which selectively connects between paths between a pump, a tank, a left and a right chamber of a power cylinder, forming a fluid pressure bridge circuit including a variable throttle which is opened or closed in response to a steering operation. In accordance with the invention, a first and a second fluid pressure bridge circuit are connected in parallel which define the control valve between a feed path for a pressure fluid from a pump and a return path to a tank, and the second fluid pressure bridge circuit comprises a variable throttle which is opened or closed in response to a steering operation, and a vehicle speed responsive variable throttle valve which is controlled to be opened or closed in response to a vehicle speed.

As a result of the described arrangement, the invention provides the following excellent effects despite its simple and inexpensive arrangement.

In accordance with the invention, the vehicle speed responsive variable throttle valve in the second fluid pressure bridge circuit is brought toward its closed condition when the vehicle is running at a low speed, whereby the pressure oil from the pump is substantially entirely fed to the supply side cylinder chamber of the power cylinder to produce a required assisting force, thus enabling an adequate control over the steering force.

During the steering operation which occurs when the vehicle is running at a high speed, the vehicle speed responsive variable throttle valve in the second fluid pressure bridge circuit is brought toward its open condition, whereby the supply from the pump to the supply side cylinder chamber of the power cylinder is reduced, thus reducing the assisting force which is supplied during the steering operation. In this manner, a rigidity is imparted to the steering wheel and an adequate feeling is produced to an operator, thus securing a steering tracking capability when the vehicle is running a high speed.

Since a required control over the assisting force is enabled in accordance with the invention by merely adding the second fluid pressure bridge circuit to a conventional power steering apparatus, a high reliability is realized at a low cost, thus providing an inexpensive vehicle speed responsive power steering apparatus.

In particular, the invention dispenses with an oil pressure reaction mechanism which has been used in a power steering apparatus of oil pressure reaction control type, thus eliminating adverse influences of the friction thereof and enabling the space required for the apparatus, as viewed in the direction of the input shaft, to be reduced.

In a preferred embodiment, the control valve is of a rotary type including a rotor and a sleeve which are coupled so as to be capable of relative rotation and having a plurality of path channels formed in their surfaces which are in sliding contact with each other so as to be circumferentially spaced apart, these path channels constituting together a first fluid pressure bridge circuit by being connected for communication with an inlet port for a fluid pressure from a pump, a return port to a tank, and a left and a right output port to the left and the right chamber of a power cylinder. In addition, channels forming a second fluid pressure bridge circuit, comprising second path channels into which second inlet ports for a fluid pressure from the pump open, and a left and a right connection channel which are located on the opposite sides of the second path channel as viewed in the circumferential direction and into which connection ports, communicating to a connection path in which a vehicle speed responsive variable throttle valve is disposed, open are formed in the opposing surfaces of the rotor and the sleeve, which constitute together the control valve, in a region between the path channels of the first bridge circuit which communicate with the return ports to the tank. In addition, first variable throttles are formed between the path channels communicating to the inlet port and the left and the right path channels communicating with the output ports, and second variable throttles are formed between the left and right path channels communicating with the output ports and the path channels communicating to the left and right return ports. Additionally, third variable throttles are formed between the second path channels communicating to the second inlet ports and the left and right connection channels which are located on the opposite sides, corresponding to the connection ports, as viewed circumferentially, of the second path channels and fourth variable throttles are formed between the left and right connection channels and adjacent path channels communicating to the return ports.

The above object is accomplished by a control valve connecting between a pump and a tank, comprising a first fluid pressure bridge circuit, and a second fluid pressure bridge circuit. The first fluid pressure bridge circuit comprises a first and second pair of left and right variable throttles disposed in left and right paths and controlled to be opened or closed in response to a steering operation, the left and right paths located between the first and second pairs of variable throttles being connected to the left and right chambers, respectively, of the power cylinder. The second fluid pressure bridge circuit comprises a third and fourth pair of left and right variable throttles disposed in the left and right paths and controlled to be opened or closed in response to a steering operation, and a connection path for connecting between the left and right paths intermediate the third and the fourth pair of variable throttles. A vehicle speed responsive variable throttle valve may be disposed in the connection path so as to be controlled to be opened or closed in accordance with a vehicle speed. Alternatively, the second fluid pressure bridge circuit may comprise a third, a fourth and a fifth pair of left and right variable throttles disposed in the left and right paths so as to be controlled to be opened or closed in response to a steering operation, and a connection path for connecting between the left and right paths intermediate the third and the fourth pairs of variable throttles and in which a vehicle speed responsive variable throttle valve is disposed so as to be controlled to be opened or closed in accordance with a vehicle speed.

Also, the above object is accomplished by providing a control valve formed by a fluid pressure bridge circuit including a left and right branch path, having a first and second pair of left and right variable throttles therein which are controlled to be opened or closed in response to a steering operation, for selectively switching a path connection between a pump, a tank and left and right chambers of a power cylinder. A bypass path which connects between the left and right branch paths is provided intermediate the first and the second pair of variable throttles of the control valve, separately from the left and right output paths leading to the left and right chambers of the power cylinder, and a third pair of left and right variable throttles which are controlled to be opened or closed in response to a steering operation, and a variable throttle valve which is controlled to be opened or closed in accordance with a condition (such as vehicle speed, for example) other than a steer angle are disposed in series in the bypass path.

As a result of the described arrangement, the invention provides the following excellent effects, despite a simple and inexpensive arrangement: Specifically, in accordance with the invention, a variable throttle valve in the bypass path which may be of a vehicle speed responsive type may be brought toward a closed condition when the vehicle is running at a low speed while the third pair of variable throttles are opened and closed in accordance with a steer angle, whereby the pressure oil from the pump is substantially entirely fed to the supply side chambers of the power cylinder to produce a required assisting force, thus assuring adequate control over the steering force.

During a steering operation which occurs when the vehicle is running at a high speed, the variable throttle valve in the bypass path which may be of a vehicle speed responsive type is brought toward its open condition while the third pair of variable throttles are opened and closed to a required opening in accordance with a steer angle, whereby the supply of the pressure oil from the pump to the chambers of the power cylinder are controlled to reduce the assisting force, thereby imparting a rigidity to the steering wheel and assuring an adequate feeling to an operator in order to secure a steering tracking capability when the vehicle is running at a high speed.

It will be seen that in accordance with the invention, an inexpensive vehicle speed responsive power steering apparatus of a high reliability is provided at a low cost, by merely adding to a conventional power steering apparatus, a bypass path including a vehicle speed responsive variable throttle valve or a third pairs of variable throttles which are of a steer angle responsive type to enable a control over the assisting force.

It will also be seen that the invention dispenses with an oil pressure reaction mechanism which has been used in a conventional power steering apparatus of oil pressure reaction control type, thus eliminating the adverse influences of the friction of such mechanism, while simultaneously reducing the space required for the arrangement as viewed in the direction of the input shaft.

In the power steering apparatus according to the invention, it is preferred that one of the third pair of left and right variable throttles, which are disposed in series with the variable throttle valve of a vehicle speed responsive type in the bypass path, which is brought toward its closed condition in response to the steering operation be disposed in that one of the branch paths which assumes a high pressure in response to the steering operation and which supplies the fluid pressure to one of the chambers of the power cylinder, and that the other of the third pair of variable throttles which is brought toward its open condition in response to the steering operation be disposed downstream of said one of the third pair of variable throttles.

In a preferred embodiment, a rotary control valve is provided having a rotor and a sleeve including a plurality of path channels, formed in their surfaces which are disposed in sliding contact with each other and which are circumferentially spaced apart at a given interval, forming a fluid pressure bridge circuit by communication with an inlet port for a fluid pressure from a pump, a return port to a tank, and left and right output ports communicating to the left and right chambers of a power cylinder. Formed between the path channels in the rotor and the sleeve which communicate with the return ports to the tank are a left and a right path channel into which a fluid pressure leading to a left and right output port is introduced through a communication port, and left and right communication channels which are located circumferentially adjacent to the left and right path channels and which are selectively brought into communication with each other through a relative rotational displacement of the rotor and the sleeve and into which communication ports open which communicate with a communication path or a bypass path having a variable throttle valve disposed therein which is controlled to be opened or closed in response to a condition other than a steer angle.

DETAILED DESCRIPTION OF PREFERRED EMBODIMENTS

Figure 1:
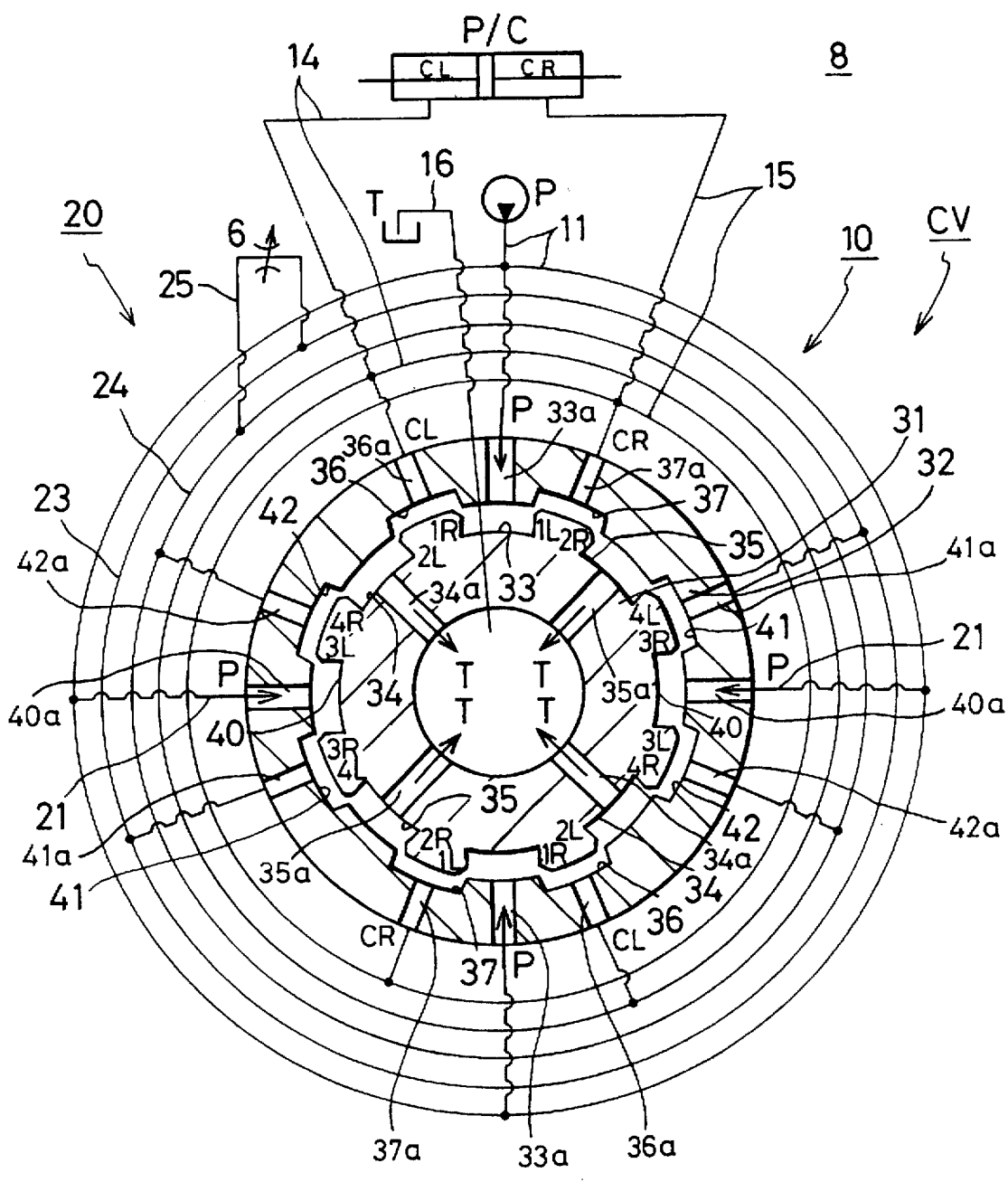
FIG. 1 is a schematic cross section, showing an essential construction of a rotary control valve incorporating the invention, and also illustrating a power steering apparatus according to one embodiment of the invention.
Figure 2:
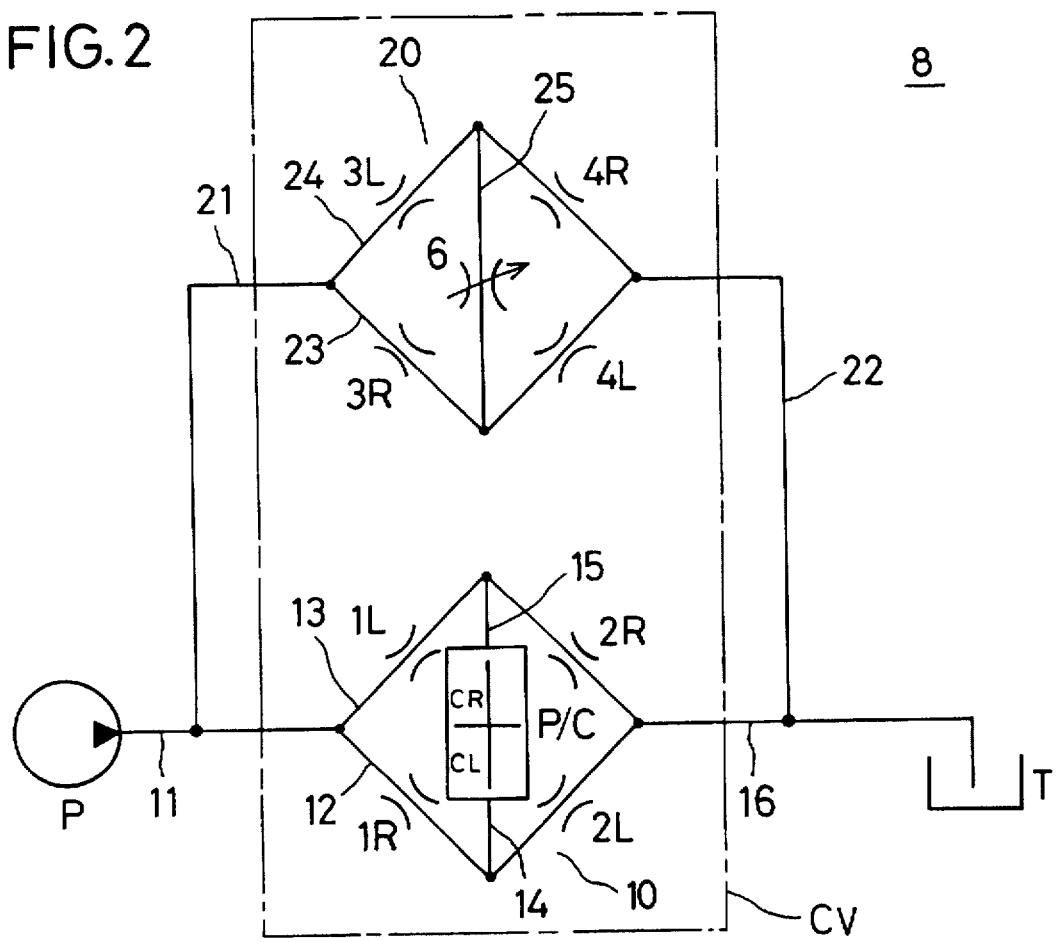
FIG. 2 is a schematic view for illustrating the essential construction of the power steering apparatus of the invention.

FIGS. 1 to 4 show a vehicle speed responsive power steering apparatus according to one embodiment of the invention, which is generally shown by numeral 8. Referring to FIG. 2, an oil pressure circuit of the apparatus will be briefly described. The oil pressure circuit shown includes a pump P, acting as a source of oil pressure, which feeds an oil pressure through supply paths 11, 21 to a control valve CV, which is switched by an operation of a steering wheel and thence to a power cylinder (shown by charactor P/C) acting as an actuator of the apparatus. The cylinder includes left and right chambers CL, CR, and thence the oil pressure is returned to a tank T.

It will be seen that the supply path 11 leads from the pump P to a first fluid pressure bridge circuit of the control valve CV where it is divided into left and right branch paths 12, 13, forming the first fluid pressure bridge circuit 10 together with left and right cylinder paths 14, 15 communicating with paths 12, 13, respectively and leading to the left and right chambers of the power cylinder P/C. A return path 16 connects the first fluid pressure bridge circuit 10 to the tank T.

As is well recognized, a first pair of variable throttles 1R, 1L and a second pair of variable throttles 2L, 2R, are disposed in the left and right paths 12, 13, respectively, so as to be oppositely located. The left and right cylinder paths 14, 15 branch from the left and right paths 12, 13, respectively, at locations corresponding to junctions between the first and second pairs of variable throttles 1R, 2L; 1L, 2R for suitably feeding an oil pressure to the left and right chambers CL, CR of the power cylinder or returning it to the tank.

A second fluid pressure bridge circuit 20 is connected in parallel with the first fluid pressure bridge circuit 10, and comprises variable throttles 3L, 3R, 4R and 4L which are opened and closed in response to a steering operation, and a vehicle speed responsive variable throttle valve 6 which is opened or closed in accordance with a vehicle speed. The supply path 21 feeds an oil pressure from the pump P to the second fluid pressure bridge circuit 20, and the oil pressure is returned to the tank T from the bridge circuit 20 through a return path 22.

Specifically, the second fluid pressure bridge circuit 20 includes a left and a right path 23, 24 in which a third pair of left and right variable throttles 3R, 3L and a fourth pair of left and right variable throttles 4L, 4R are disposed, these throttles being in turn opened or closed in response to a steering operation. The variable throttle valve 6 is disposed in a connection path 25 which connects between the left and the right path 23, 24 intermediate the third and the fourth pair of valve 3R, 4L and 3L, 4R.

With the described arrangement, when no steering operation takes place, the oil pressure from the pump P passes through the left and the right path 12, 13 of the first oil pressure bridge circuit 10 to be returned to the tank T, and also passes through the left and the right path 23, 24 of the second fluid pressure bridge circuit 20 to be returned to the tank T.

Referring to FIG. 2, as a steering operation takes place when the vehicle is running at a low speed, the vehicle speed responsive variable throttle valve 6 in the second fluid pressure bridge circuit 20 is brought toward its closed condition, whereby the oil pressure from the pump P is fed substantially in its entirety to the cylinder chamber CR or CL on the supply side to the first fluid pressure bridge circuit 10 of the control valve CV to actuate the power cylinder P/C, thus producing a required assisting force.

As a steering operation takes place when the vehicle is running at a high speed, the variable throttle valve 6 in the second bridge circuit 20 shown in FIG. 2 is brought toward its open condition, whereby part of the oil pressure from the pump P is bypassed to the tank T. In this manner, the amount of the oil pressure supplied to the cylinder chamber CR or CL on the supply side through the first fluid pressure bridge circuit 10 of the control valve CV can be properly controlled, reducing the actuating pressure to the power cylinder P/C. This reduces the assisting force produced by the power cylinder, thus imparting a rigidity to the steering wheel and assuring a suitable feeling to an operator who performs a steering operation. In this manner, it is possible to assure a steering tracking capability when the vehicle is running at a high speed.

Figure 3:
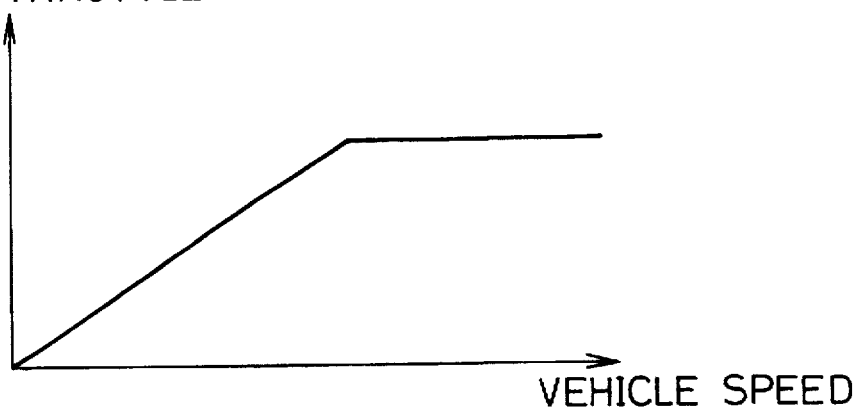
FIG. 3 graphically shows a change in the area of opening of a vehicle speed responsive variable throttle valve used in the apparatus of the invention, plotted against the vehicle speed.

The area of opening of the vehicle speed responsive variable throttle valve 6 can be controlled with respect to the vehicle speed in a manner illustrated in FIG. 3, for example. This allows the return flow to the tank T through the second fluid pressure bridge circuit 20 to be controlled in a required manner, with consequent control over the amount of pressure oil supplied to the cylinder chamber CR or CL of the power cylinder P/C which occurs during the steering operation, assuring that an assisting force or power corresponding to the vehicle speed be obtained.

With the described arrangement, by merely adding the second fluid pressure bridge circuit 20 to a conventional power steering apparatus 8, a required control over the assisting force is achieved. In this manner, a high reliability is attained at a low cost, thus providing an inexpensive vehicle speed responsive power steering apparatus.

In addition, it will be seen that an oil pressure reaction mechanism which has been used in a conventional power steering apparatus of oil pressure reaction control type can be dispensed with in accordance with the invention, thus eliminating adverse influences of the friction thereof while simultaneously allowing the space required for the apparatus, as viewed in the direction of the input shaft, to be reduced.

Figure 4:
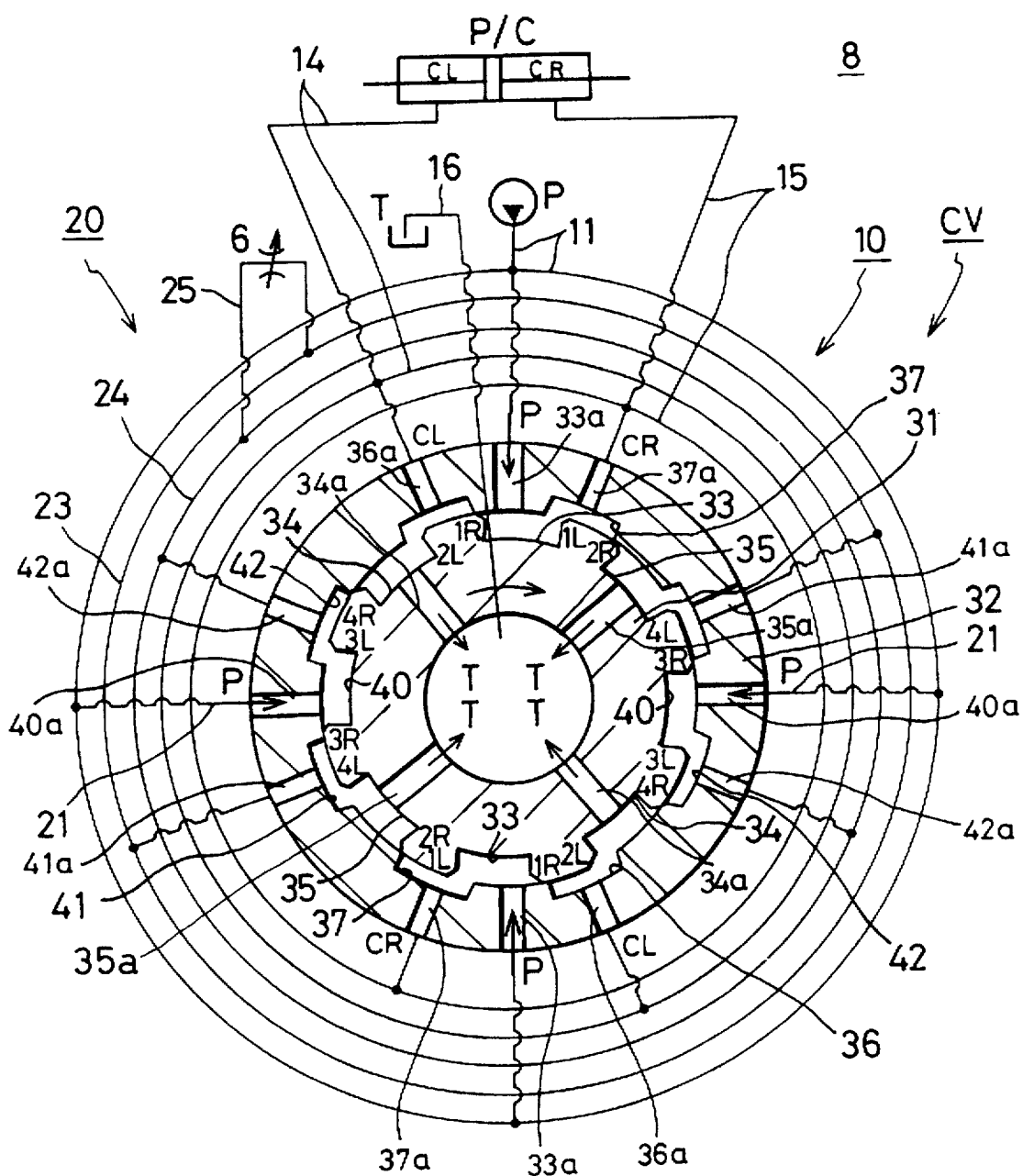
FIG. 4 is a schematic cross section of the rotary control valve shown in FIG. 1 when a steering operation has taken place.

Referring to FIGS. 1 and 4, a control valve CV of rotary valve type in which the invention is incorporated will be described in detail. A rotor 31 is integrally mounted on an input shaft (stub shaft) which is connected to a steering wheel, not shown, and is surrounded by a sleeve 32 which is integrally mounted on an output shaft (pinion shaft) associated with a wheel or wheels being steered, not shown. The rotor 31 and the sleeve 32 are combined together by a torsion bar or the like, which is known in itself, to permit a relative rotation therebetween, and are housed within a valve housing, not shown.

A plurality of path channels 33 (which are two in number in the example shown) are formed in the outer periphery of the rotor 31 at a given circumferential spacing therebetween, and are located symmetrically opposite to each other about the axis of the rotor 31. An inlet port 33a (which is also designated by P) which is connected through a supply path 11 to the oil pump P, acting as a source of fluid pressure, opens into the path channel 33. A plurality of path channels 34, 35 (which are each two in number in the example shown, providing a total of four channels) are formed on the opposite side of the path channels 33 at a given spacing therefrom as viewed in the circumferential direction, and return ports 34a, 35a (also designated by T) which are connected to the return path 16 leading to the oil tank T through the internal space within the rotor 31 are formed in the rotor 31 to extend in the centripetal direction and open into the path channels 34, 35, respectively.

A plurality of path channels 36, 37 (which are each two in number in the example shown, providing a total of four channels) are formed in the inner periphery of the sleeve 32 on the opposite sides of the inlet ports 33a and adjacent thereto in a region between the return ports 34a, 35a so as to communicate with the path channels 33, 34 or 35, and left and right output ports 36a, 37a (also designated by CL, CR) which are connected to the output paths 14, 15 leading to the left and the right cylinder chamber CL, CR of the power cylinder P/C open into these path channels 36, 37.

In other words, the path channels 33, the path channels 34, 35, and the path channels 36, 37 as well as the power cylinder output paths 14, 15 form together the first fluid pressure bridge circuit 10 mentioned above.

The first variable throttles 1R, 1L which are opened or closed in response to a relative rotation or displacement between the rotor 31 and the sleeve 32 are formed between the path channels 36, 37 on the output side and the path channels 33 on the inlet side. Similarly, the second variable throttles 2L, 2R are formed between the path channels 36, 37 on the output side and the path channels 34, 35 on the return side.

Second path channels 40 are formed in the outer periphery of the rotor 31 intermediate the two pairs of flow path switching regions defined by the path channels 33, the path channels 36, 37 located on the opposite sides thereof and the path channels 34, 35 which are further removed on the opposite sides thereof. The supply paths 11 and 21 extending from the pump P are connected to second inlet port 40a, which are formed in the sleeve 32 and which open into the second path channels 40. It will be noted that the second path channels 40 are located opposite to each other and at an angle of 90° with respect to the path channels 33 around the outer periphery of the rotor 31.

Pairs of left and right connection channels 41, 42 are formed in the inner periphery of the sleeve 32 on the opposite sides of the second path channels 40 so as to be located in a region between the path channels 35, 34 on the return side. Connection ports 41a, 42a, communicating with the connection path 25 disposed between left and right paths 23, 24 which constitute the second fluid pressure bridge circuit 20 including the vehicle speed responsive variable throttle valve 6, open into the left and the right connection grooves 41, 42. In this manner, the second path channels 40, the left and the right connection channel 41, 42, and the left and the right path 23, 24, the connection path 25 and the vehicle speed responsive variable throttle valve 6 constitute together the second fluid pressure bridge circuit 20 mentioned above.

Third variable throttles 3R, 3L are formed between the second path channels 40 associated with the second inlet ports 40a and the left and the right connection channel 41, 42 which are located on the opposite sides thereof, as viewed in the circumferential direction, and which are associated with the connection ports 41a, 42a. Similarly, fourth variable throttles 4L, 4R are formed between the left and the right connection channel 41, 42 and the adjacent path channels 35, 34 associated with the return ports 35a, 34a, respectively. It is to be noted that in the present embodiment, path channels, connection and communication channels and ports which have the similar functions are located symmetrically about the axis of the rotor 31 and the sleeve 32 so as to be balanced in the radial direction, thus facilitating the machinability and the cost considerations.

In the described valve construction, when a relative rotation or displacement occurs between the rotor 31 and the sleeve 32 in response to a steering operation, the first, the second, the third and the fourth variable throttle are controlled to respective given openings in accordance with a steer angle, changing the status of communication between the various channels to switch the flow path in the oil pressure circuit.

The first, the second, the third and the fourth variable throttle, which are variable throttles responsive to a steering load, are controlled to present a throttle opening response which enables the first and the second variable throttle 1L, 1R, 2R, 2L to function as the first fluid pressure bridge circuit 10 in the control valve CV, and the third and the fourth variable throttle 3R, 3L, 4L, 4R in the second fluid pressure bridge circuit 20 are similarly controlled to switch the flow path. The vehicle speed responsive variable throttle valve 6 disposed in the connection path 25 of the second fluid pressure bridge circuit 20 is opened and closed in accordance with the vehicle speed, whereby the amount of bypass flow through the second fluid pressure bridge circuit 20 is controlled, thus controlling the amount of oil pressure fed to the power cylinder P/C to provide a required magnitude of assisting force.

In the construction of this embodiment, the first and the second fluid pressure bridge circuit 10, 20, which form together the control valve CV, are integrally assembled into the rotary valve portion comprising the rotor 31 and the sleeve 32, and it will be seen that a mere addition of the second bridge circuit 20 and the vehicle speed responsive variable throttle valve 6 to the arrangement of a conventional valve is all that is required to provide a vehicle speed responsive power steering apparatus 8 which achieves a required control over the assisting force at a low cost and with a high reliability.

Figure 5:
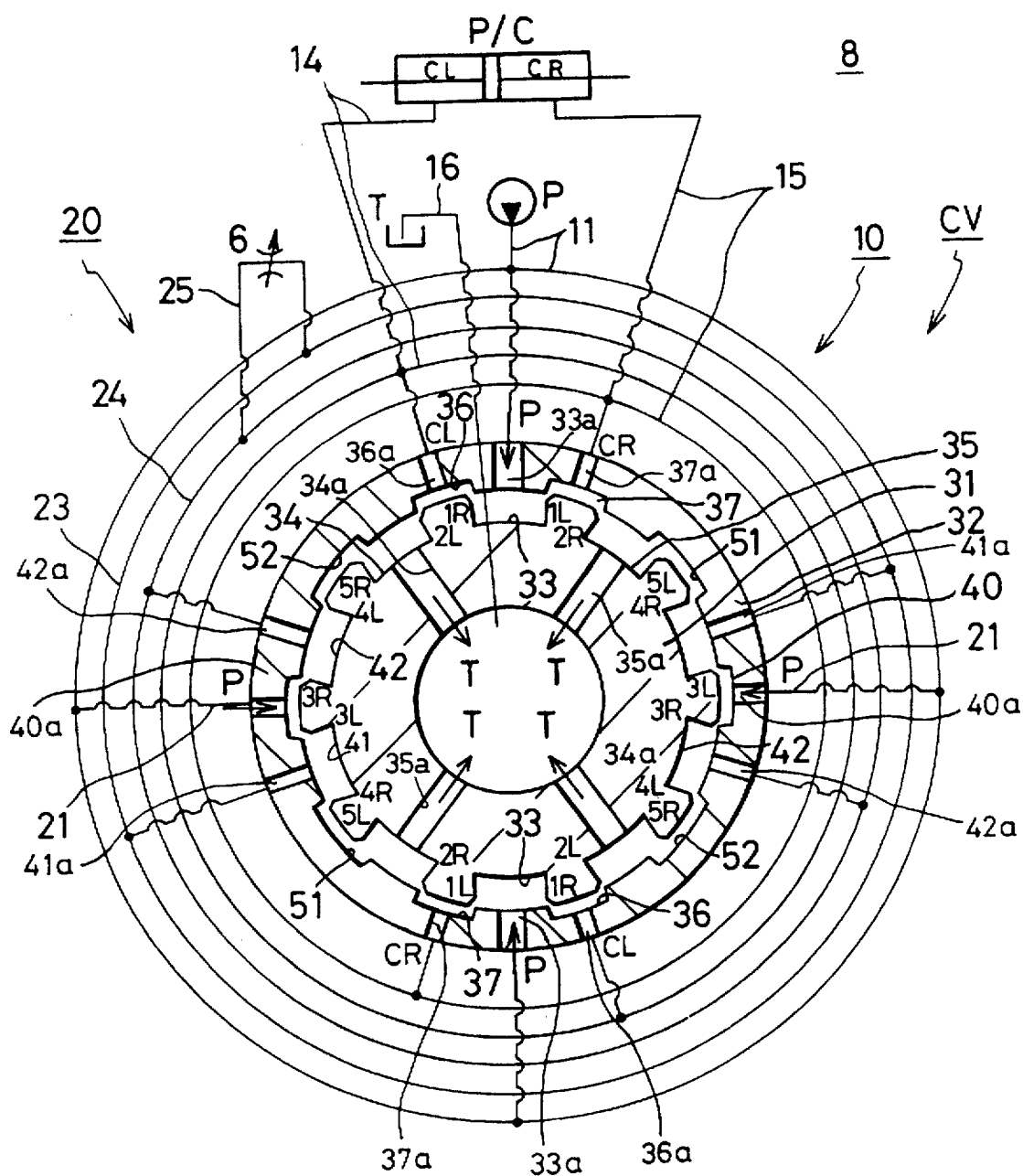
FIG. 5 is a schematic cross section of an essential construction of a rotary control valve incorporating the invention, also illustrating a power steering apparatus according to a second embodiment of the invention.
Figure 6:
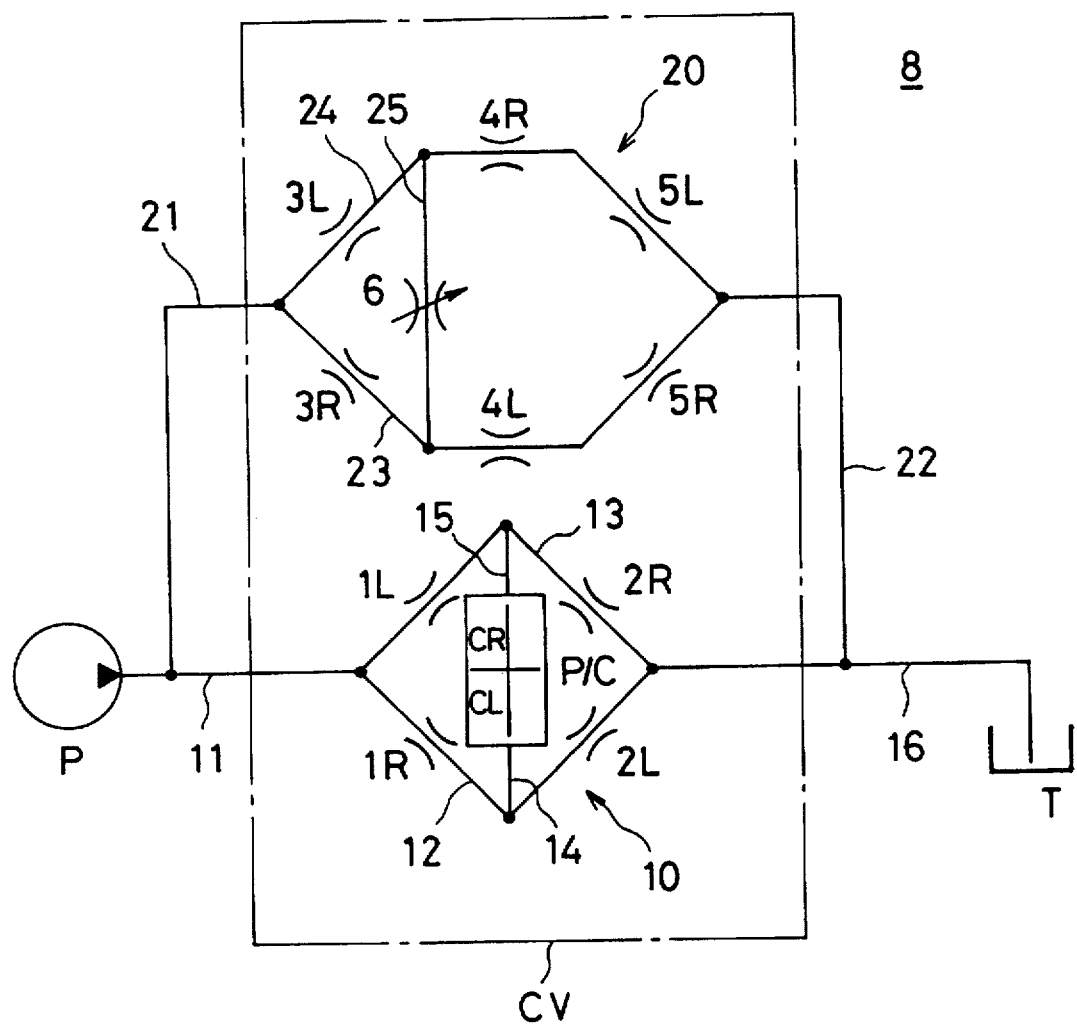
FIG. 6 is a schematic view illustrating the essential construction of the power steering apparatus of the second embodiment.
Figure 7:
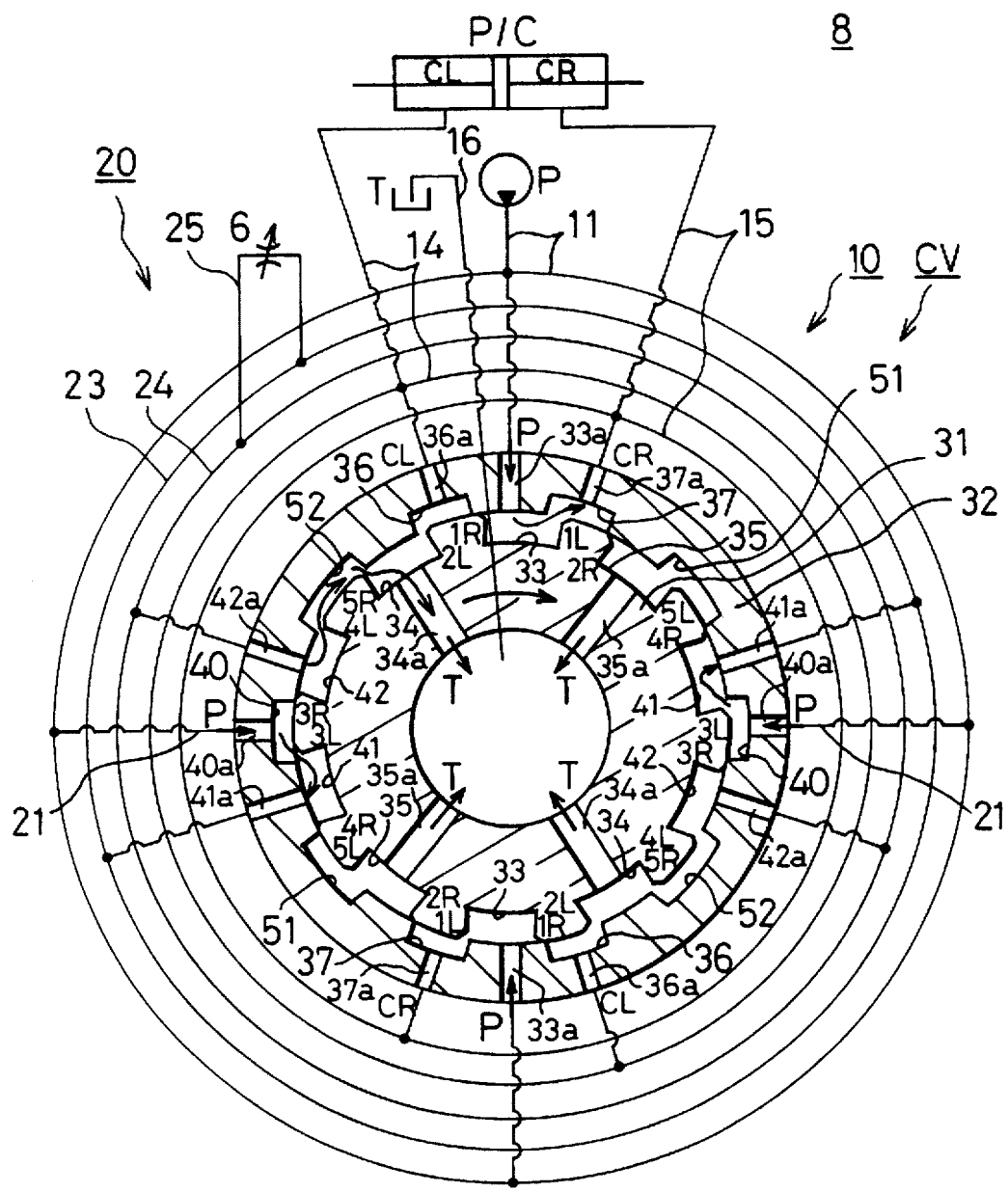
FIG. 7 is a schematic cross section of the rotary control valve shown in FIG. 5 when a steering operation has taken place.

FIGS. 5 to 7 show a vehicle speed responsive power steering apparatus according to a second embodiment of the invention, and in these Figures, corresponding parts are designated by like numerals and characters as used before in describing the embodiment shown in FIGS. 1 to 4 and will not be repeatedly described.

Referring to FIG. 6, it will be seen that fifth variable throttles 5R, 5L are disposed downstream of the fourth variable throttles 4L, 4R in the left and the right path 23, 24 in the second fluid pressure bridge circuit 20. By choosing the response presented by the fifth variable throttles 5R, 5L, in particular, the response in the closing direction such that these variable throttles have a greater steer angle when they are closed, a more effective control over the steering force can be achieved in accordance with the steer angle and the vehicle speed.

In the control valve CV of this embodiment, communication channels 51, 52 are disposed between the left and the right connection channels 41, 42, which are located on the opposite sides of the second path channels 40 of the second bridge circuit 20 and the first path channels 35, 34 on the return side, thereby selectively providing a communication therebetween. Fourth variable throttles 4R, 4L are formed between the communication channels 51, 52 and the connection channels 41, 42, while fifth variable throttles 5L, 5R are formed between the communication channels 51, 52 and the path channels 35, 34 on the return side. It is to be noted that numeral 6 represents a vehicle speed responsive variable throttle valve. In other respects, the arrangement and the function are similar to those mentioned previously, and therefore it will not be repeated.

It is to be understood that the invention is not limited to the specific construction of the embodiments mentioned above, but it should be understood that the speed responsive power steering apparatus 8, and the first and the second fluid pressure bridge circuit 10, 20 of the control valve CV associated therewith may be suitably changed and modified in confuguration and construction. By way of example, in the described embodiments, the throttle opening response with respect to the steering torque of the first, the second, the third and the fourth variable throttles 1L, 1R, 2L, 2R, 3L, 3R, 4R, 4L and possibly the fifth variable throttles 5L, 5R, and the throttle opening response of the variable throttle valve 6 with respect to the vehicle speed may be changed as desired in accordance with the requirements of parts used and the construction of various parts. While the body of the power steering apparatus in which the control valve CV is assembled or the power cylinder P/C have not been described in detail, it should be understood that they may be constructed in a conventional manner.

Figure 8:
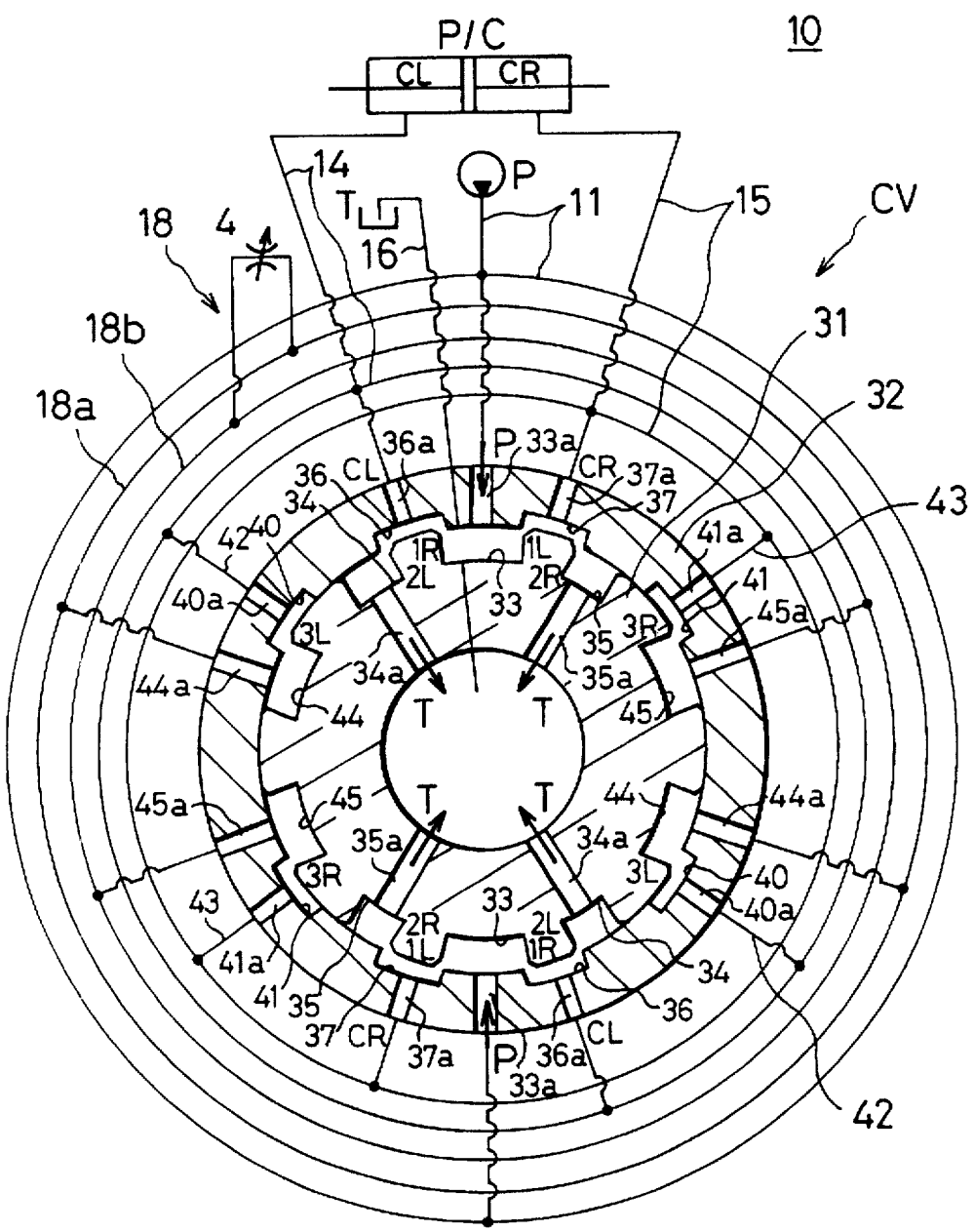
FIG. 8 is a schematic cross section of an essential construction of a rotary control valve incorporating the invention, and also illustrating a vehicle speed responsive power steering apparatus according to a third embodiment of the invention.
Figure 9:
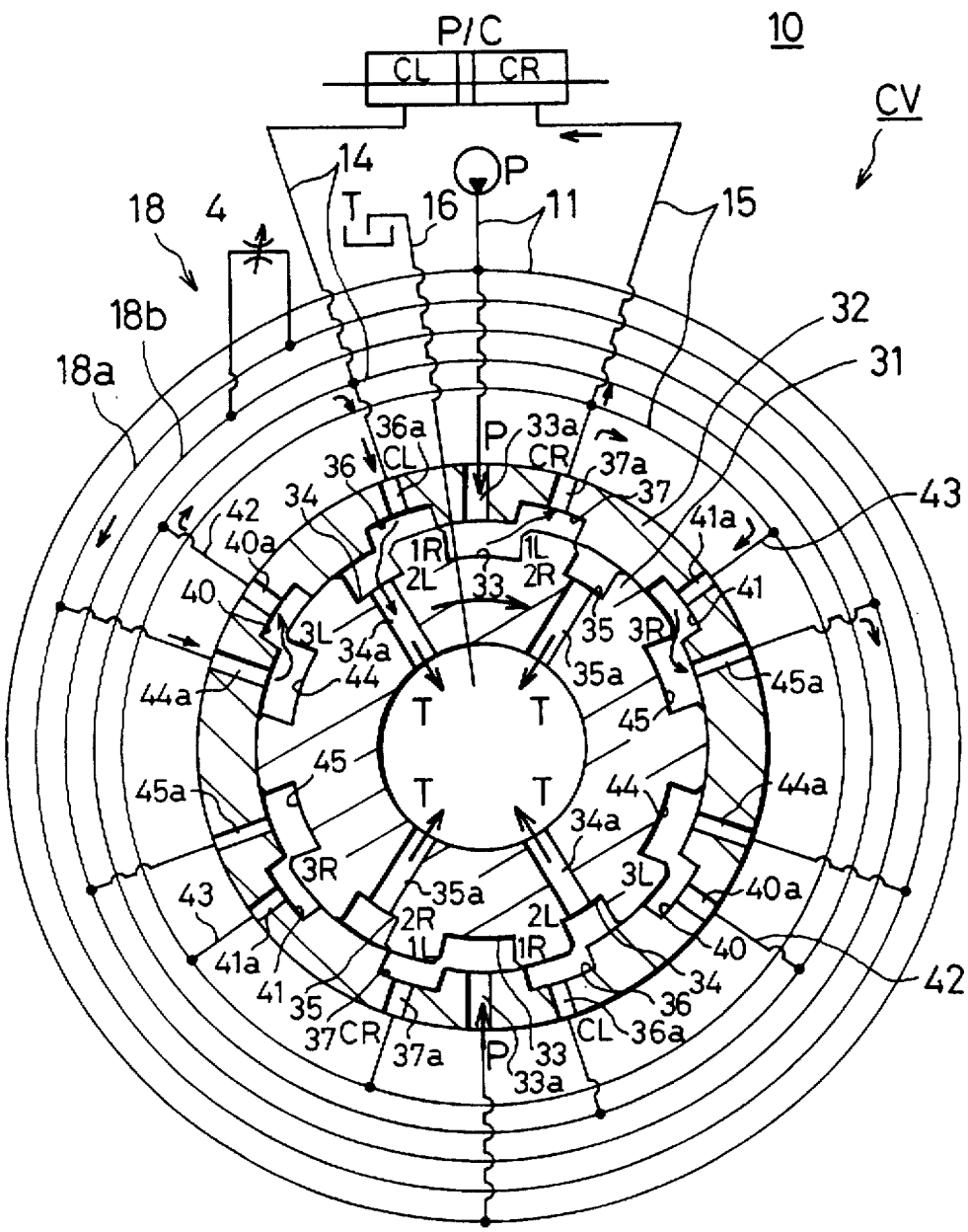
FIG. 9 is a schematic cross section of the rotary control valve shown in FIG. 8 when a steering operation has taken place.
Figure 10:
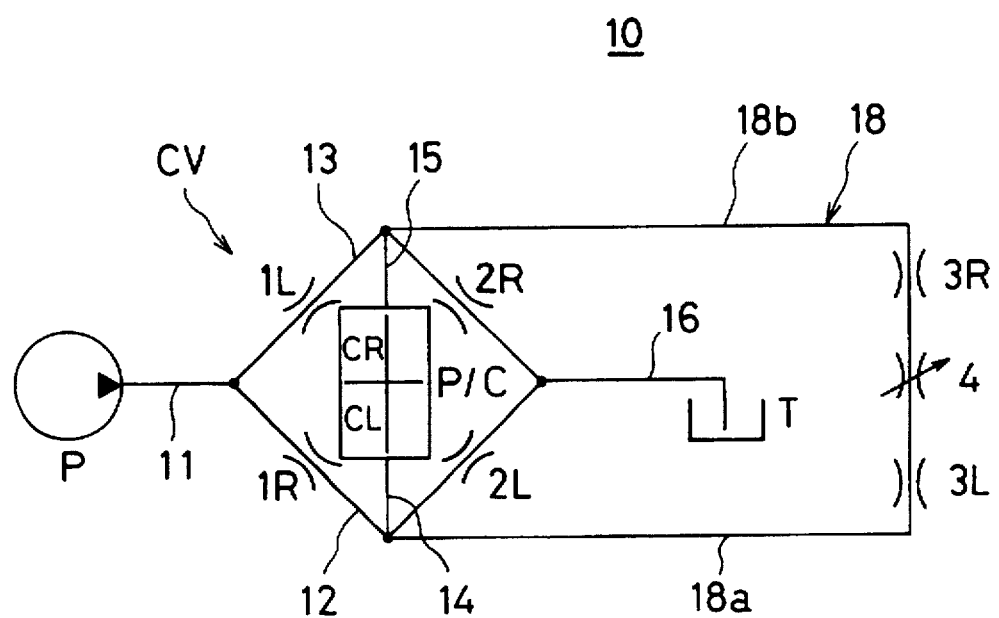
FIG. 10 is a schematic view showing the essential construction of the power steering apparatus of the third embodiment.

FIGS. 8 to 10 show a vehicle speed responsive power steering apparatus according to a third embodiment. Initially referring to FIG. 10 which schematically illustrates an oil pressure circuit of the vehicle speed responsive power steering apparatus, generally shown by numeral 10, the oil pressure which is fed from a main pump P, acting as a source of oil pressure, through a supply path 11 is fed through a control valve CV which is controlled in response to a steering operation through a steering wheel so as to be fed to left and right chambers CL, CR of a power cylinder (shown by P/C), acting as an actuator of the apparatus, and is then returned to a tank T.

As before, a supply path 11 feeds an oil pressure from the pump P to the oil pressure bridge circuit in the control valve CV, which includes left and right branch paths 12, 13 forming a bridge circuit together with left and right cylinder paths 14, 15 which serve as output paths from the branch paths 12, 13 to left and right chambers CL, CR of the power cylinder P/C, the branch paths being merged into a return path 16 to the tank T.

As is well known, a first pair of variable throttles 1R, 1L and a second pair of variable throttles 2L, 2R, which are controlled in response to a steering operation, are disposed in the left and the right branch paths 12, 13 respectively, so as to be opposite to each other. The left and right cylinder paths 14, 15 branch from the left and right paths 12, 13, respectively, at locations corresponding to junctions between the first and second pairs of variable throttles 1R, 2L; 1L, 2R for suitably feeding an oil pressure to the left and right chambers CL, CR of the power cylinder or returning it to the tank.

As is recognized, in such power steering apparatus 10, the oil pressure from the pump P is fed to the left and the right chamber CL, CR of the power cylinder P/C, by switching the paths 12, 13, in accordance with the direction of steering and the steering angle of the steering wheel, whereby the oil pressure is fed to one of the chambers CR, CL through the path 14 or 15 while the other chamber is connected to the tank T through the other of the paths 15 and 14. In this manner, an assisting force which assists in the steering operation is obtained.

Thus, the power steering apparatus 10 includes a control valve CV defined by a fluid pressure bridge circuit which selectively connects the pump P and the tank T to either chamber CL, CR of the power cylinder by a switching control which occurs in response to a steering operation. At this end, the control valve CV includes the left and the right branch path 12, 13 having a first and a second pair of left and right variable throttles 1R, 1L, 2L, 2R disposed therein, which are controlled to be opened or closed in response to a steering operation and the left and the right cylinder path 14, 15 which connect to either chamber CL, CR between the first and the second variable throttles 1R, 2L; 1L, 2R in the left and the right branch path 12, 13.

In accordance with this embodiment of the invention, a bypass path 18 (including portions 18a, 18b) which connect between the left and the right branch path 12, 13 is provided, separately from the left and the right cylinder path 14, 15 leading to the power cylinder P/C. A third pair of left and right variable throttles 3L, 3R which are controlled in response to a steering operation, and a vehicle speed responsive variable throttle valve 4 which is controlled in accordance with a parameter other than a steer angle, namely, a vehicle speed in this embodiment, are disposed in series in the bypass path 18. In the embodiment shown, the variable throttle valve 4 is interposed between the third pair of variable throttles 3L, 3R.

In accordance with the invention, one of the third pair of variable throttles 3L, 3R, which may be variable throttles 3R (or 3L), which is operated in the closing direction in response to the steering operation is disposed in that branch path 13 (or 12) which assumes a high pressure in response to the steering operation to feed the fluid pressure to one of the chambers CR (or CL) of the power cylinder, and the other variable throttle 3L (or 3R) which is operated in the opening direction in response to the steering operation is disposed downstream of said one variable throttle 3R. In other words, the third variable throttles 3L, 3R which form the pair are disposed in series in the sequence such that the flow of the oil pressure occurs from the branch path 13 associated with the end of the bypass path 18 which assumes a high pressure in response to a steering operation to feed the chamber CR (CL) of the power cylinder, through one of the third variable throttles, which may be 3R (or 3L) which is operated in the closing direction in response to the steering operation, and then through the other variable throttle 3L (or 3R) which is operated in the opening direction in response to the steering operation.

With the described arrangement, when no steering operation takes place, the pressure oil from the pump P passes through either branch path 12, 13 of the fluid pressure bridge circuit to be returned to the tank T. When a steering operation takes place, some of the first and the second variable throttles 1L, 2L, 1R, 2R which are disposed on the left or the right side of the fluid pressure bridge circuit are operated in the closing direction to reduce their opening while the other variable throttles are operated in the opening direction, with consequence that one of the left and the right branch path 12, 13 is connected to one of the left and the right chamber CL, CR of the power cylinder to feed the oil pressure, while the other chamber is returned to the tank T.

As a steering operation takes place when the vehicle is running at a low speed, the variable throttle valve 4 disposed on the bypass path 18 which provides a communication between the both cylinder chambers CL, CR assumes a nearly closed condition, as will be evident from the operating response shown in FIG. 3, whereby the opening of communication between the supply side cylinder chamber CR or CL and the return side cylinder chamber CL or CR of the power cylinder P/C is reduced, allowing the pressure oil from the pump P being supplied substantially in its entirety to the supply side cylinder chamber CR or CL through the control valve CV, thus actuating the power cylinder P/C and producing the required assisting force.

As a steering operation takes place when the vehicle is running at a high speed, the variable throttle valve 4 on the bypass path 18 is controlled toward its open condition, providing a communication between the supply side cylinder chamber CR or CL (which assumes a high pressure) and the return side cylinder chamber CL or CR (which assumes a low pressure), and the third variable throttles 3L, 3R, which are disposed in series with the variable throttle valve 4, are controlled in accordance with the steer angle, allowing part of the pressure oil from the pump to be bypassed. In this manner, the amount of pressure oil which is fed through the fluid pressure bridge circuit of the control valve CV to the supply side cylinder chamber CR or CL can be properly controlled so as to reduce the actuating pressure applied to the power cylinder P/C to reduce the assisting force produced thereby, allowing a proper feeling to be imparted to an operator of the steering operation.

By controlling the area of the opening of the variable throttle valve 4 with respect to the vehicle speed in a manner as described in detail in FIG. 3, it is possible to control the communication between the left and the right chamber CR, CL of the cylinder through the bypass path 18 in a required manner, so that the amount of the pressure oil fed to either supply side cylinder chamber CR or CL be properly controlled, thereby producing an assisting force which corresponds to the vehicle speed.

In the described arrangement, a required control over the assisting force can be achieved by merely adding the vehicle speed responsive variable throttle valve 4 and the third pair of variable throttles 3L, 3R which are responsive to the steering angle in series in the bypass path 18, to a conventional arrangement of the power steering apparatus 10, thereby enabling a power steering of vehicle speed responsive type to be provided inexpensively or at a reduced cost and with a high reliability.

Again, an oil pressure reaction mechanism which has been used in a conventional power steering apparatus of oil pressure reaciton control type is dispensed with, thus removing adverse influences of friction thereof while simultaneously reducing the space required for the apparatus as viewed in the direction of the input shaft.

Referring to FIGS. 8 and 9, a control valve CV of rotary valve type in which the invention is corporated will be described in detail. A rotor 31 is integrally mounted on an input shaft (stub shaft) which is connected to a steering wheel, not shown, and is surrounded by a sleeve 32 which is integrally mounted on an output shaft (pinion shaft) associated with a wheel or wheels being steered, not shown. The rotor 31 and the sleeve 32 are combined together by a torsion bar or the like, which is known in itself, to permit a relative rotation therebetween, and are housed within a valve housing, not shown.

A plurality of path channels 33 (which are two in number in the example shown) are formed in the outer periphery of the rotor 31 at a given circumferential spacing therebetween, and are located symmetrically opposite to each other about the axis of the rotor 31. An inlet port 33a (which is also designated by P) which is connected through a supply path 11 to the oil pump P, acting as a source of fluid pressure, opens into the path channel 33. A plurality of path channels 34, 35 (which are each two in number in the example shown, providing a total of four channels) are formed on the opposite side of the path channels 33 at a given spacing therefrom as viewed in the circumferential direction, and return ports 34a, 35a (also designated by T) which are connected to the return path 16 leading to the oil tank T through the internal space within the rotor 31 are formed in the rotor 31 to extend in the centripetal direction and open into the path channels 34, 35, respectively.

A plurality of path channels 36, 37 (which are each two in number in the example shown, providing a total of four channels) are formed in the inner periphery of the sleeve 32 on the opposite sides of the inlet ports 33a and adjacent thereto in a region between the return ports 34a, 35a so as to communicate with the path channels 33, 34 or 35, and left and right output ports 36a, 37a (also designated by CL, CR) which are connected to the output paths 14, 15 leading to the left and the right cylinder chamber CL, CR of the power cylinder P/C open into these path channels 36, 37.

The first variable throttles 1R, 1L which are opened or closed in response to a relative rotation or displacement between the rotor 31 and the sleeve 32 are formed between the path channels 36, 37 on the output side and the path channels 33 on the inlet side. Similarly, the second variable throttles 2L, 2R are formed between the path channels 36, 37 on the output side and the path channels 34, 35 on the return side.

Left and right path channels 40, 41 are formed in the outer periphery of the rotor 31 in the two pairs of flow path switching regions defined between the path channels 33, the path channels 36, 37 located on the opposite sides thereof, and the path channels 34, 35 which are further located on the opposite sides thereof, in a manner circumferentially adjacent to the path channels 34, 35 on the return side. These left and right path channels 40, 41 allow the oil pressure fed to left and right output ports 36a, 37a to be introduced through communication ports 40a, 41a. It will be noted that the left and the right path channel 40, 41 communicate with the paths 14, 15, respectively through paths 42, 43.

Left and right connection channels 44, 45 are located circumferentially adjacent to the left and the right path channel 40, 41, and are selectively brought into communication with the each other through a relative rotation or displacement between the rotor 31 and the sleeve 32. Communication ports 44a, 45a which communicate with communication paths 18a, 18b, defining the bypass path 18 and having a vehicle speed responsive variable throttle valve 4 disposed therein, open into the left and right connection channel 44, 45, respectively.

Third variable throttles 3L, 3R are formed between the left and the right path channel 40, 41 into which the left and the right communication port 40a, 41a open and the left and the right connection channel 44, 45 into which the connection ports 44a and 45a open, and similarly a vehicle speed responsive variable throttle valve 4 which is controlled in accordance with a parameter other than a steer angle, in particular, a vehicle speed, is provided in the communication paths 18A, 18B (or path 18) which connect between the left and the right connection port 44a, 45a.

As before, path channels, connection channels and various ports which have corresponding functions are located symmetrically about the axes of the rotor 31 and the sleeve 32 so as to assume a balanced position in the radial direction, thus facilitating the machinability and the cost consideration.

In the valve construction described, a relative rotation or displacement between the rotor 31 and the sleeve 32 which occurs in response to a steering operation causes the first, the second and the third variable throttles to be controlled to respective given openings in accordance with the steer angle, thus changing the communication between the various channels to switch the flow path in the oil pressure circuit.

The first, the second and the third variable throttles which respond to a steering load are constructed such that the first and the second variable throttles 1L, 1R, 2R, 2L are controlled to present a throttle opening response which allow them to function as a control valve CV and such that the third variable throttles 3R, 3L on the bypass path 18 are similarly controlled to provide a switching of the flow path. The vehicle speed responsive variable throttle valve 4 on the bypass path 18 is controlled in accordance with the vehicle speed so that the amount of bypass flow through the bypass path 18 be controlled thereby, thus controlling the amount of the pressure oil supplied to the power cylinder P/C to achieve a required assisting force.

As mentioned above, the bridge circuit which defines the control valve CV, the bypass path 18, the vehicle speed responsive variable throttle valve 4 disposed therein, and the third variable throttles 3L, 3R which are responsive to the steer angle are integrally assembled into the rotary valve mechanism which comprises the rotor 31 and the sleeve 32. Accordingly, by merely adding the bypass path 18 and the variable throttle valve 4 to a conventional valve, a desired control over the assisting force can be exercised at a reduced cost and with a high reliability.

Such construction allows the variable throttles 3L, 3R or the like which constitute the bypass path 18 to be retrofitted into a control valve CV of a rotary type by a simple channel machining, thereby enabling a speed responsive function to be simply exercised with a simple construction. In addition, the size of the apparatus as viewed in the direction of the input shaft is reduced, both contributing to a reduction in the cost.

By choosing the locations and the width of the left and the right path channel 40, 41 or the left and the right connection channel 44, 45 so that the third variable throttles 3L, 3R exhibit a greater opening/closing response, in particular, a greater angle where the throttles are closed as compared with the remaining variable throttles, a return path for the pressure oil is secured at a given opening, thereby enabling a more effective control over the steering force in accordance with the stter angle and the vehicle speed.

It should be understood that the invention is not limited to specific construction of the embodiments described above, but that the arrangement of a speed responsive power steering apparatus 10 itself or various parts thereof such as the fluid pressure bridge circuit and the bypass path 18 of the control valve CV may be suitably changed or modified in configuration or construction. By way of example, the throttle opening response against the steering torque of the first, the second and the third variable throttles 1L, 1R, 2L, 2R, 3L, 3R or the throttle opening response against the vehicle speed of the vehicle speed responsive variable throttle valve 4 of the described arrangements may be suitably modified to meet varying demands of the instruments applied and design parameters of various parts.

In the described embodiment, the variable throttle valve 4 which is disposed in series with the third variable throttles 3L, 3R in the bypass path 18 is described as being controlled in accordance with a parameter other than a steer angle, namely, a vehicle speed as an example, but it should be understood that the invention is not limited thereto. For example, the variable throttle valve 4 may be controlled in accordance with a steering rate, a steering angular rate, a lateral acceleration or the like. Again, with respect to the third embodiment, the body of the power steering apparatus in which the control valve CV is assembled or the power cylinder P/C has not been illustrated or described in detail, but a known construction can be used.

What is claimed is:

1. A power steering apparatus including a control valve which is opened or closed in response to a steering operation for selectively switching a path between a pump, a tank and left and right chambers of a power cylinder, the improvement wherein:

the control valve includes a first fluid pressure bridge circuit and a second fluid pressure bridge circuit that are connected in parallel between a supply path for a pressure fluid from the pump and a return path to the tank;

the first fluid pressure bridge circuit comprises a first set of variable throttles which are opened and closed in response to the steering operation and which are connected to the left and right chambers of the power cylinder for regulating fluid flow to and from the left and right chambers of the power cylinder in response to the steering operation; and the second fluid pressure bridge circuit comprises a second set of variable throttles, separate from the first set of variable throttles, which are opened and closed in response to the steering operation, and a vehicle speed responsive variable throttle valve which is positioned between the variable throttles forming the second set of variable throttles and which is for controlling fluid flow through said second set of variable throttles and which is controlled to be opened or closed in accordance with a vehicle speed, whereby the power steering apparatus is responsive to vehicle speed.

2. The power steering apparatus according to claim 1, wherein:

the first set of variable throttles forming the first fluid pressure bridge circuit include a first pair and a second pair of left and right variable throttles which are arranged in a left path and a right path, respectively, and which are controlled to be opened or closed in response to the steering operation, and the left chamber and the right chamber of the power cylinder are connected to the left path and the right path at junctions between the first pair and the second pair of variable throttles; and the second set of variable throttles forming the second fluid pressure bridge circuit include a third pair and a fourth pair of left and right variable throttles which are arranged in a left path and a right path, respectively, and which are controlled to be opened or closed in response to the steering operation, and wherein the vehicle speed responsive variable throttle valve is connected to junctions between the third and the fourth pairs of variable throttles.

3. The power steering apparatus according to claim 1, wherein:

the first set of variable throttles forming the first fluid pressure bridge circuit include a first pair and a second pair of left and right variable throttles which are disposed in a left path and a right path, respectively, and which are controlled to be opened and closed in response to the steering operation, and wherein the left chamber and the right chamber of the power cylinder are connected to the left path and the right path, respectively, at junctions between the first and the second pairs of variable throttles; and the second set of variable throttles forming the second fluid pressure bridge circuit include a third pair, a fourth pair and a fifth pair of left and right variable throttles which are arranged so that one variable throttle from each of the third fourth and fifth variable throttle pairs forms part of a left path and a right path and which are controlled to be opened or closed in response to the steering operation and wherein the vehicle speed responsive variable throttle valve is connected between the left path and the right path intermediate the junctions between the third pair variable throttles and the fourth pair variable throttles forming paths.

4. The power steering apparatus according to claim 1, wherein:

the control valve is a rotary type valve and includes a rotor and a sleeve which are assembled together to permit a relative rotation therebetween and the rotor and the sleeve are formed to have opposed surfaces which are disposed in sliding contact with each other wherein the surfaces of the rotor and of the sleeve are formed with a plurality of first path channels which are circumferentially spaced apart and which define the first fluid pressure bridge circuit wherein the first path channels are in communication with a first inlet port for receiving the pressurized fluid from the pump, return ports for discharging the pressure fluid to the tank and left and right output ports leading to the left chamber and the right chamber of the power cylinder; and the surfaces of the rotor and the sleeve are further formed with second path channels defining the second fluid pressure bridge circuit wherein the second path channels are located between the first path channels forming the first fluid pressure bridge circuit wherein the second path channels are in fluid communication with a second inlet port for receiving pressurized fluid from the pump, the return ports and a left connection channel and a right connection channel which are located circumferentially on the opposite sides of the second inlet port, wherein the connection channels are in communication with connection ports and the connection ports are connected to a connection path that allows fluid flow between the connection ports and the connection channels wherein the vehicle speed responsive variable throttle valve is disposed in the connection path to regulate fluid flow through the connection path.

5. The power steering apparatus of claim 4, wherein:

the rotor and the sleeve are shaped to form a first pair and second pair of left and right variable throttles that are the first set of variable throttles and a third pair and fourth pair of left and right variable throttles that are the second set of variable throttles;

a first one of the first pair of left and right variable throttles is formed between the first path channel to which the first inlet port is connected and the first path channel to which the left output port is connected and a second one of the first pair of left and right variable throttles is formed between the first path channel to which the first inlet port is connected and the first path channel to which the right output port is connected;

a first one of the second pair of left and right variable throttles is formed between the first path channel to which the left outlet port is connected and a circumferentially adjacent path channel to which a return port is connected and a second one of the second pair of left and right variable throttles is formed between the first path channel to which the right outlet port is connected and a circumferentially adjacent path channel to which a return port is connected;

a first one of the third pair of left and right variable throttles is formed between the second path channel to which the second inlet port is connected and the left connection channel and a second one of the third pair of left and right variable throttles is formed between the second path channel to which the second inlet port is connected and the right connection channel; and a first one of the fourth pair of left and right variable throttles is formed between the left connection channel and a circumferentially adjacent second path channel connected to a return port and a second one of the fourth path channels is formed between the left connection channel and a circumferentially adjacent second path channel to which a return port is connected.

6. The power steering apparatus of claim 5, wherein:

the rotor and the sleeve are further formed to define a plurality of communication channels, each communication being located between a separate left connection channel or right connection channel and a second path channel circumferentially adjacent the connection channel to which a return port is connected; and the control valve is further provided with a fifth pair of left and right variable throttles that are part of the second set of variable throttles, wherein each fifth pair variable throttle is located between a separate one of the communications channels and the circumferentially adjacent second path channel to which a return port is connected.

* * * * *